Feb. 13, 1940.  E. FOSHIE  2,190,284

DRILL MACHINE CONTROL APPARATUS

Filed Oct. 7, 1938  3 Sheets-Sheet 1

INVENTOR
Edgar Foshie.
BY Harness, Lind, Peter & Harris.
ATTORNEYS.

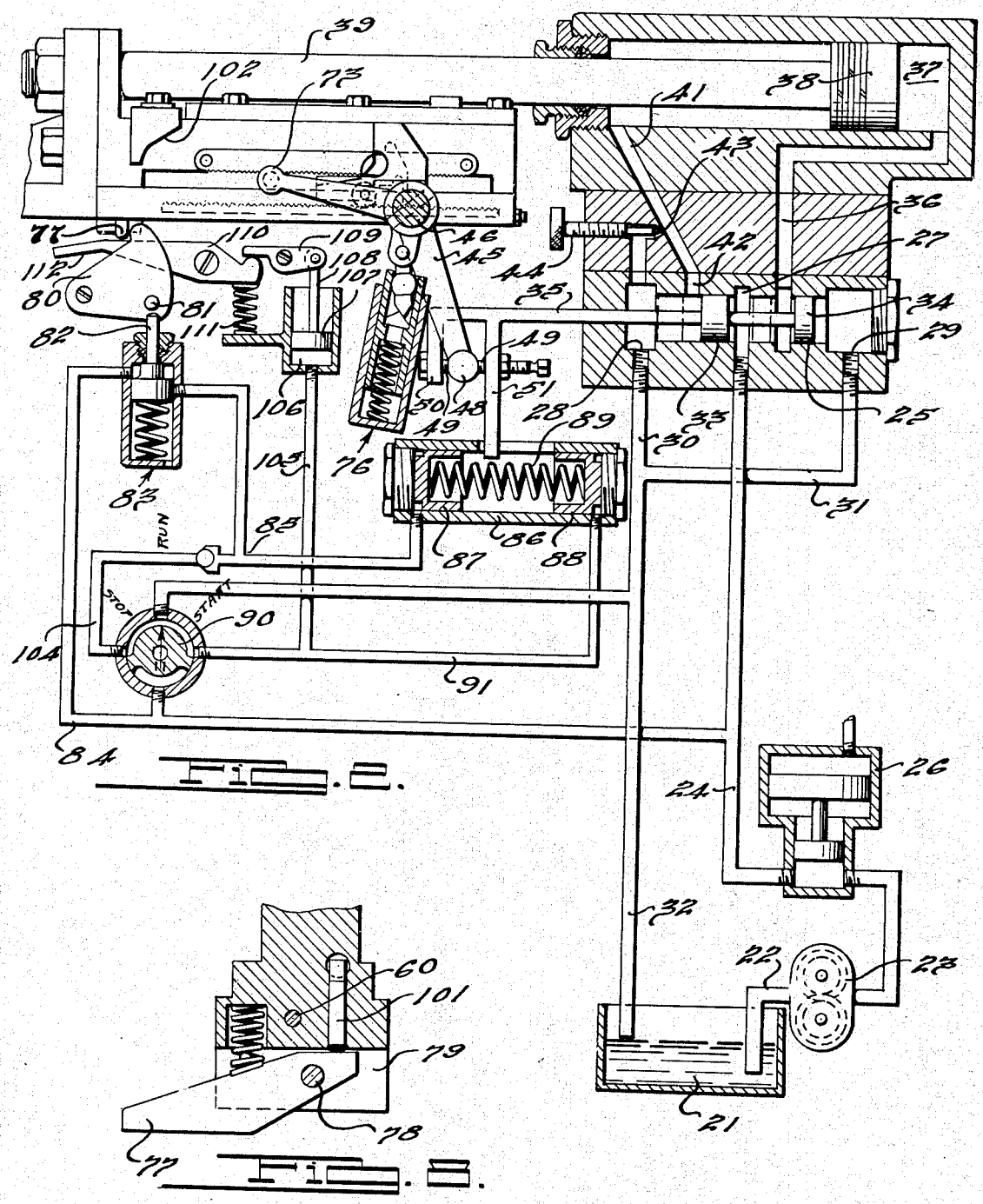

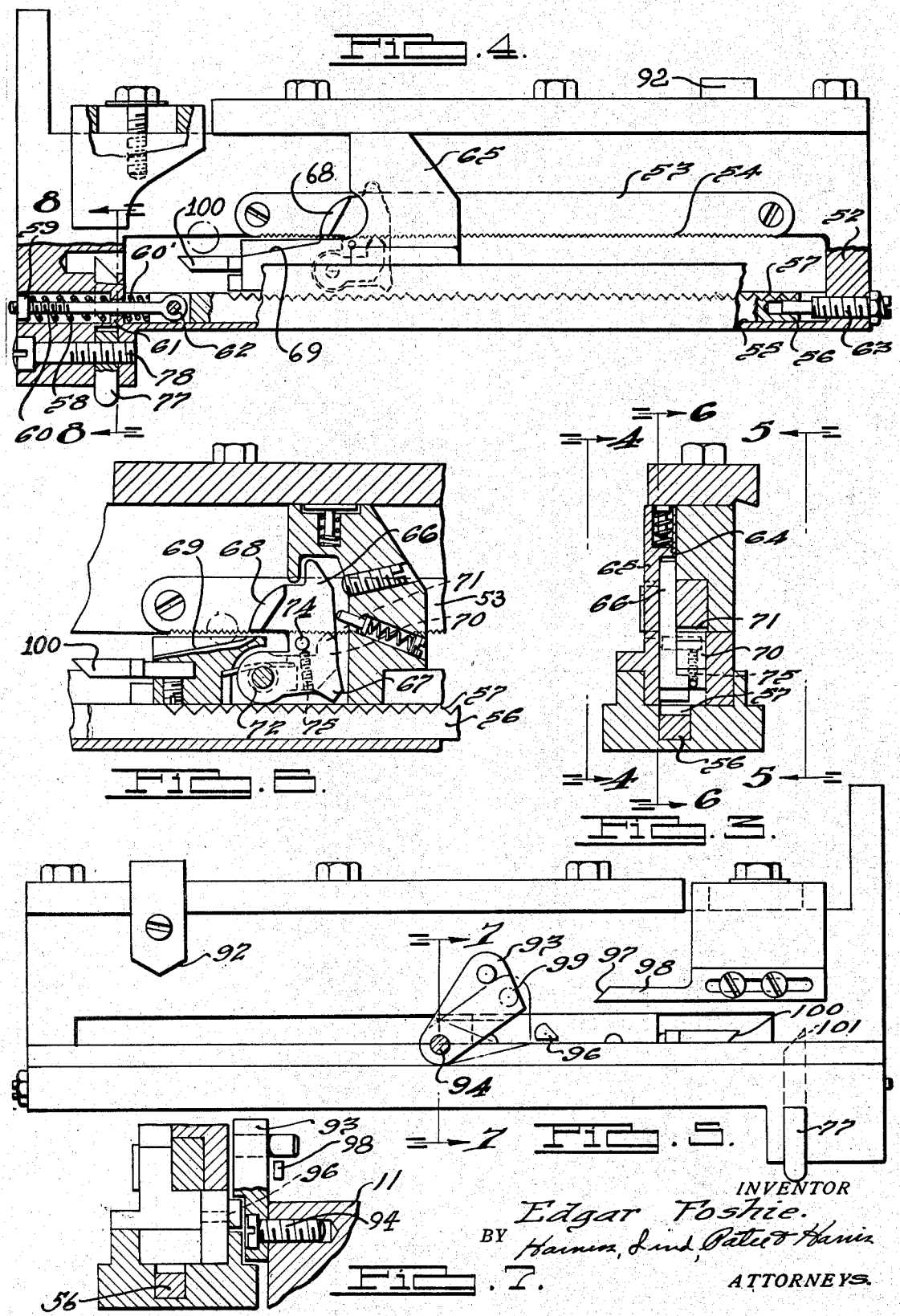

Patented Feb. 13, 1940

2,190,284

UNITED STATES PATENT OFFICE 2,190,284

DRILL MACHINE CONTROL APPARATUS

Edgar Foshie, Detroit, Mich.

Application October 7, 1938, Serial No. 233,705

7 Claims. (Cl. 77—32)

This invention relates to improvements in drill machine control apparatus.

More particularly, the invention pertains to improved control apparatus of this kind by which a drill while continuously rotating may be repeatedly withdrawn and reinserted after successive increments of a deep drilling operation.

One of the main objects of the invention is the provision in control apparatus of this kind of improved mechanism for automatically so controlling a drill as to cause it to rapidly move throughout an initial distance toward a piece of work at a fast rate until it is in position to commence drilling thereon, to move into the work to a predetermined depth at a relatively slower rate, to move away from the work at a rapid rate in order to clean the partially formed bore and cool the drill, and to return toward the work at said first mentioned fast rate throughout a distance equal to said initial distance plus the previous drilled depth.

Another object of the invention is the provision of improved control mechanism of this kind which comprises structurally sturdy parts that are not susceptible to breakage, to provide control mechanism of this kind which acts upon the valve of a fluid pressure drill actuating system to cause the latter to perform the foregoing cycle automatically until a bore of predetermined depth has been drilled; and to provide means for adjustably predetermining the depth of each drilling step of a drilling operation by which only a single adjustment is required to drilling depth of each step at the same valve.

An illustrative embodiment of the invention is shown in the accompanying drawings, in which:

Fig. 2 is a diagrammatic illustrational view of the control apparatus shown in Fig. 1.

Fig. 3 is an enlarged transverse sectional view taken on the line 3—3 of Fig. 1.

Fig. 4 is a side elevational view showing a portion of the apparatus shown in Fig. 3, partially in section and partially in side elevation, as viewed from the line 4—4 of Fig. 3.

Fig. 5 is a side elevational view of the apparatus shown in section in Fig. 3 as viewed from the line 5—5 of the latter figure.

Fig. 6 is a fragmentary longitudinal sectional view taken on the line 6—6 of Fig. 3.

Fig. 7 is a fragmentary transverse sectional view taken on the line 7—7 of Fig. 5.

Fig. 8 is a fragmentary transverse sectional view taken on the line 8—8 of Fig. 4.

Figure 1:
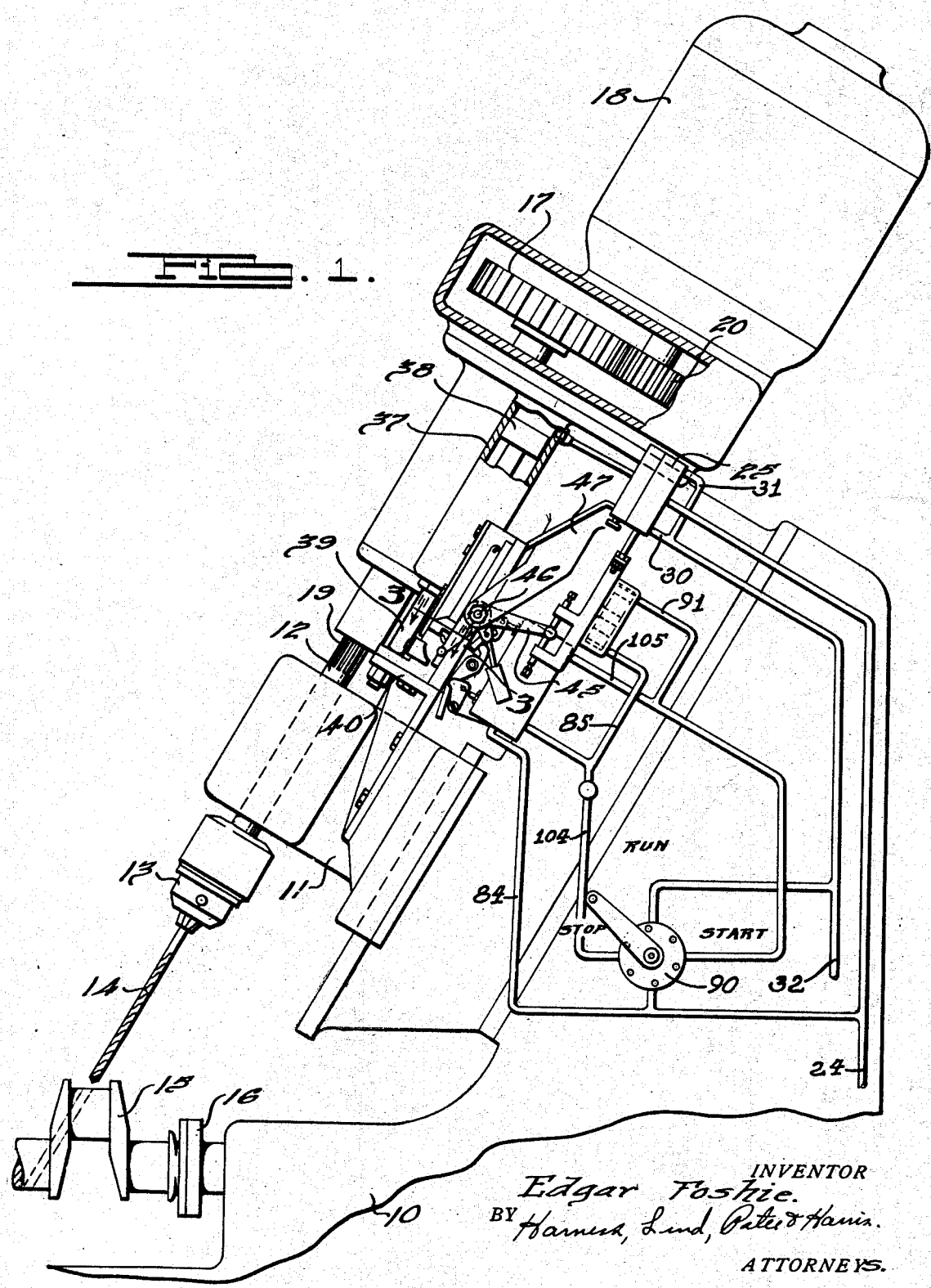
Fig. 1 is a fragmentary, side elevational view of a drill press including control apparatus embodying the invention.

In the drawings is illustrated an embodiment of the control apparatus in a drill press comprising a base structure 10 on which is slidably mounted a fixture 11 in which is supported a rotatable spindle 12 having a drill chuck 13 on its lower end. A drill 14 engaged in the chuck 13 is adapted to perform a deep bore drilling operation upon a crankshaft 15, or other piece of work, suitable mounted in a work support 16 carried by the base structure 10 of the machine. The drill spindle 12 has a splined upper end portion 19 which is slidably but non-rotatably connected with transmission gearing 17 which is adapted to be drivingly operated by a motor 18 having a pinion 20 meshed with the transmission gearing 17. The transmission mechanism and motor are fixed with respect to the base structure 10 of the machine and the spindle 12 is adapted to slide in the direction of its longitudinal axis with respect thereto.

The drill 14 is advanced toward and retracted from the work by movement of the fixture 11 relative to the base of the machine under the action of the control apparatus embodying the invention. This control apparatus includes a fluid pressure system, diagrammatically shown in Fig. 2 which is mainly of conventional construction and which is adapted to automatically rapidly advance the drill toward the work until it engages the latter, to slowly move the drill into the work during a limited drill operation comprising only an increment of the total depth of the bore being made. The apparatus thereafter rapidly retracts the drill to facilitate cleaning of the partially formed bore and cooling of the drill. Thereafter the drill is rapidly advanced again toward the work throughout a distance including the partially formed depth of the bore. Each successive retraction and advancement cycle of the drill therefore necessitates the movement of the drill throughout an additional distance equal to the depth of the previously formed increment of the bore. The present invention embodies improvements of resetting mechanism by which the increase in the length of rapid return movement of the drill is made after each successive partial drilling operation and subsequent withdrawal of the drill. In order to clearly describe these improvements, it is deemed necessary to describe the operation of the fluid pressure system portion of the apparatus.

The fluid pressure system portion of the apparatus comprises a reservoir 21 having an outlet 22 connected with a pump 23 by which fluid medium is placed under pressure and supplied through a conduit 24 to a valve mechanism comprising a cylinder 25. Interposed between the valve mechanism 25 and the pump 23 is an accumulator 26 by which the fluid pressure medium supplied through the conduit 24 is held at a predetermined constant pressure. The cylinder 25 of the valve has a pressure inlet port 27 and outlet ports 28 and 29 connected by conduits 30 and 31, respectively, with a return pipe 32 leading back to the reservoir 21. Reciprocably mounted in the cylinder 25 of the valve structure is a tandem valve unit having valve elements 33 and 34 mounted on a reciprocable rod 35. The left end portion of the rod 35 projects externally of the valve casing, as illustrated in Fig. 2. The valve mechanism is provided with an outlet port 36 which communicates with the right end of an actuating cylinder 37 in which a piston 38 is reciprocably mounted. The cylinder 37 is stationarily mounted, as illustrated in Fig. 1, with respect to the base structure of the machine. The piston 38 has a piston rod 39 which is secured to a bracket 40 mounted on the fixture 11 and through which the fixture 11 is drivingly reciprocated to move the drill 14 throughout the foregoing cycle. A passage 41 leading from the left end of the cylinder 37 communicates with a port 42 leading to the cylinder 25 of the valve mechanism as illustrated in Fig. 2. The valve mechanism includes a bleed orifice 43 which is variable by a needle valve 44 and which forms a communicative connection between the passage 41 and the left end of the cylinder 25 of the valve mechanism.

The valve mechanism is automatically actuated by a bell crank lever 45 pivotally mounted at 46 on a bracket 47 stationarily fixed with respect to the base structure of the machine. The bell crank lever 45 has a downwardly extending arm provided on its lower extremity with a knob 48 which is engaged between set screws 49 carried by fingers 50 and 51 extending downwardly from the valve actuating rod 35, as viewed in Fig. 2. When the valve mechanism is disposed in the position illustrated in Fig. 2, the pressure supply passage 24 is in direct communication with the port 36 and the passage 41 is in direct communication with the return pipe 32 through the interior of the cylinder 25. This is the condition of the valve mechanism at the start of a drill operation or after any one of the successive stages of a drill cycle. Pressure applied on the right end of the cylinder 37 rapidly urges the drill toward the work and as the drill moves toward the work, the lever 45 is rotated in a clockwise direction, as viewed in Fig. 2, in timed relationship to the movement of the drill by mechanism hereinafter described. This rotation of the bell crank 45 causes the valve elements 33 and 34 to be moved in obstructing relationship with respect to the ports 42 and 36 respectively, thereby decreasing the rate of flow of fluid to the right end of the cylinder 37 and accordingly reducing the rate of movement of the drill toward the work to a rate which is suitable for the drilling of the material of the work. After the drill has performed a predetermined increment of the desired total drilling operation, further clockwise rotation of the bell crank 45 produced in a manner hereinafter set forth moves the valve elements 33 and 34 to their extreme left position, as illustrated in dotted lines in Fig. 2. With the valve mechanism in this condition, the fluid pressure supply conduit 24 is directly connected with the passage 41 and port 42 in order to rapidly supply fluid medium to the left end portion of the cylinder 37 and to rapidly return the piston 38 to the right end of the cylinder 37, thereby withdrawing the drill away from the work. During this rightward movement of the piston 38 the fluid in the right end portion of the cylinder 37 is permitted to exhaust through the passage 36, left end portion of the cylinder 25 and through the pipe 31 to the return pipe 32. The foregoing cycle is repeated, it being understood that each stage of the cycle involves an increase in the fast portion of the leftward stroke of the piston which is produced by mechanism hereinafter described. Movement of the bell crank lever 45 in timed relationship with respect to the action of the drill is produced by mechanism illustrated mainly in Figs. 4 to 8, inclusive. This mechanism which is also shown in part in Fig. 1 includes a base block 52 which is carried by the bracket 40 and movable in unison with the fixture 11 and drill 14. The base block 52 has fixed thereto a plate 53 having teeth 54 along its lower edge. Provided in the lower end portion of the base block 52 is a longitudinally extending channel 55 in which is shiftably mounted a rack bar 56 having teeth 57 on its upper edge disposed in opposed relationship with respect to the teeth 54 of the plate 53. The rack bar 56 is normally yieldably urged leftwardly, as viewed in Fig. 4, by a spring 58 acting between adjustable nut 59 threaded on a link 60 and an abutment 61 disposed in the channel 55, the link 60 being pivotally attached at 62 to the left end portion of the rack bar. Rightward movement of the rack bar 56 may be variably limited by an adjusting stop screw 63. Leftward movement of the bar 56 by the spring 58 is yieldably opposed by a spring 60' which allows yielding of the bar 56 leftwardly to facilitate placement of the projection 67 between the teeth of the bar 56 and prevents wedging of the teeth in end-to-end relationship.

Slidably mounted in a longitudinally extending recess 64 formed in the left side face of the base block 52, as viewed in Fig. 3, is a stop carriage 65 on which is pivotally mounted a pawl 66 having a lower wedge-shaped projection 67 on its lower extremity which is adapted to register with and fit into the space between the teeth 57 of the rack bar 56. The pawl 66 is provided with an upwardly extending portion on which is formed a cam face 68 which is aligned with an inclined cam face 69 formed on the stop carriage 65. A second and smaller pawl 70 is pivotally mounted concentrically with the axis of the larger pawl 66 on the stop carriage 65. The small pawl 70 has a wedge-shaped projection 71 extending upwardly and adapted to register with and fit in the space between the teeth 54 of the plate 53. A coil spring 72 normally yieldably urges the small pawl 70 in a counterclockwise direction, as viewed in Fig. 6, to retain the wedge-shaped projection 71 thereof engaged with the teeth 54.

In Fig. 4 of the drawings, the stop carriage 65 may be considered as being located in the position thereof corresponding to the commencement of a drilling operation. As the base block 52 moves leftwardly, as viewed in Fig. 2, in unison with the approaching movement of the drill 14 with respect to the work, a roller 73 on the outer extremity of the upper arm of the bell crank lever 45 rides upon the inclined seat 69 of the block to produce the above mentioned initial clockwise movement of the bell crank 45 and leftward movement of the valve elements 33 and 34. Further movement of the base block 52 of the control apparatus in unison with the drill 14 brings the roller 73 into engagement with the cam face 68 of the large pawl 66, thereby rotating the pawl 66 in a clockwise direction, as viewed in Fig. 6, to bring its wedge-shaped projection 67 into engagement with the teeth 57 of the rack bar 56. During this clockwise rotation of the pawl 66 a pin 74 fixed on the pawl 66 engages a stop screw 75 threaded in the small pawl 70, thereby rotating the latter pawl in a clockwise direction, as viewed in Fig. 6, to disengage its wedge-shaped projection 71 from the teeth 54 of the plate 53.

At this stage, the drill 14 is just beginning to operate upon the work. During the drilling operation, the drill advances slowly into the work and the base block 52 continues to move in unison therewith at a slow rate. During this slow rate movement of the back block 52, the projection 67 of the large pawl 66 is held in engagement with the teeth 57 and the stop carriage 65 is held against movement in unison with the base block 52 by the roller 73 of the bell crank lever. The large pawl 66 therefore holds the rack bar 56 against movement in unison with the block 52, thus producing relative movement of the latter and the bar 56 of an amount predetermined by the set screw 63 which corresponds to the depth of each increment of drilling. This action produces a predetermined rightward shifting of the stop carriage 65 with respect to the base block 52 and the toothed plate 53. After this stage of the operation, the pawls are so operated as to reengage the projection 71 of the small pawl 70 in the teeth of the plate 53 at a new location thereon and to disengage the projection 67 of the large pawl 66 from the teeth of the rack bar 56, thereby permitting the spring 58 to return the bar 56 to its initial position.

The foregoing resetting of the pawls 66 and 70 is produced by the action of an over center spring device generally designated by the numeral 76 upon the bell crank 45 which, when the bell crank reaches a predetermined position, produces a snap over action and rotates the roller 73 of the bell crank in a clockwise direction out of engagement with the cam face 68 of the large pawl 66. The over-center spring device is brought into operation by a slight increment of movement of the lever 45 produced by the cam face 68 of the pawl 66 when rightward movement of the bar 56 is arrested by the stop screw 63. The movement of the bell crank 45 by the over-center spring device 76 translates the valve elements 33 and 34 to their extreme dotted line leftward positions shown in Fig. 2. The valve mechanism is then set to apply fluid pressure on the left side of the piston 38 in order to rapidly return the latter to the right end of the cylinder 37 as previously described.

At this stage of the operation, the drill 14 has been rapidly moved toward the work, slowly moved into the work for a short distance and then rapidly withdrawn and removed from the work. The next step of the cycle comprises a rapid return of the drill toward the work throughout a distance equal to the distance of the first rapid movement plus the first drilled increment. At the end of the return stroke of the piston and drill, a trigger 77 pivotally mounted at 78 in a slot 79 formed in the lower extremity of the base block 52 engages and rotates a lever 80 having a stop 81 thereon which in turn engages a plunger 82 of a valve generally designated by the numeral 83. The valve 83 is included in a fluid pressure circuit comprising conduits 84 and 85 by which fluid medium under pressure is supplied to the left end of a cylinder 86 shown in Fig. 2 in which is slidably mounted opposed starting and stopping pistons 87 and 88 respectively. The pistons 87 and 88 are normally yieldably urged apart by a spring 89. When the valve 83 is open, fluid pressure is supplied to the left end of the cylinder 86 and the starting piston 87 is urged rightwardly to engage with the finger 51 of the valve control rod 35, thereby moving the latter to its rightward limiting position and simultaneously rotating the bell crank lever 45 in a counterclockwise direction to its initial position. The movement of the drill may be stopped at any time during the cycle of operation by adjusting a manual control valve 90 in a fluid medium supply conduit 91 leading to the right end of the cylinder 86 and through which fluid pressure may be supplied to the latter for the purpose of urging the stopping piston 87 leftwardly, as viewed in Fig. 2.

The bell crank lever 45 is thus returned to its initial position in the foregoing manner and all the parts of the apparatus are in the same position as they were in at the commencement of the first step of the drilling operation except the stop carriage 65 which has been advanced rightwardly as viewed in Fig. 4 a distance equal to the depth of the drilling formed by the preceding drilling operation. The sequence of operations thereafter is repeated in the foregoing cycle.

After a bore has been drilled to a desired depth and it is desired to commence drilling another bore, the travelling stop carriage can be returned to its original position automatically by engagement of a stop 92 fixed on the base block 52 with a lever 93 pivotally mounted on a pin 94 stationarily mounted with respect to the base structure 10 of the machine. The stop 92 engages the lever 93 when the drill 14 has drilled into the work a desired depth and rotates the lever 93 in a clockwise direction, as viewed in Fig. 5, until it comes into alignment with a lug 96 on the right side of the stop carriage 65, as viewed in Fig. 7. The lever 93 acting through the lug 96 holds the carriage 65 against movement in unison with the base block 52, thereby causing the base block to move relative to the stop carriage until the latter has been repositioned in its starting position illustrated in Fig. 4. When the stop carriage 65 has reached its initial starting position, the cam ramp surface on a finger 98 carried by the base block 52 engages a pin 99 on the lever 93 and returns the latter to its full line position shown in Fig. 5, thereby permitting the stop carriage to go through the cycle of operations above described during the next complete drilling operation. At the time the ramp face 97 engages the pin 99, an abutment 100 carried by the stop carriage 65 engages a pin 101 vertically slidably mounted in the base block 52 and urges the latter downwardly. The lower end of the pin 101 abuts against the trigger 77 and turns it in a clockwise direction, as viewed in Fig. 8, to move it out of engagement with the valve operating lever 80, thereby permitting the trigger to pass the lever 80 without actuating it. Movement of the base block 52 beyond the position thereof which normally brings the trigger 77 into engagement with the lever 80 causes engagement of a cam face 102 carried by the base block 52 with the roller 73 of the bell crank 45. The cam face 102 is so constructed and arranged as to return the bell crank lever to a position in which it holds the valve elements 33 and 34 in closing relation with respect to the ports 42 and 36, thus completely stopping reciprocating operation of the drill which may be continuously drivingly rotated if desired.

The valve mechanism may be started in operation by manually positioning the valve 90 to admit fluid under pressure through the conduit 104 which leads to the left end of the cylinder 81 and urges the starting piston 87 rightwardly to engage the finger 51 and thereby return the valves 33 and 34 to their full line starting position shown in Fig. 2.

Emergency stopping of the apparatus may be accomplished by so setting the valve 90 as to admit fluid under pressure to flow therefrom through the conduit 91 to the right end of the cylinder 86 so as to move the stopping piston 88 leftwardly against the finger 51. While this action takes place, fluid medium under pressure is also supplied through a branch conduit 105 to a cylinder 106 in which is reciprocably mounted a piston 107. The piston 107 has a piston rod 108 pivotally attached to a lever 109 which is adapted to engage a lever 110 that is normally urged in a counterclockwise direction by a spring 111. Counterclockwise rotation of the lever 109 causes clockwise rotation of the lever 110 and the latter lever has an extension 112, which, upon clockwise rotation, is adapted to lift the trigger 77 out of engagement with the lever 80, thereby permitting the base block 52 and the drill to return to its fully retracted position without resetting the valve mechanism to commence a cycle. The block 65, however, is not reset in position so that the drill will rapidly return to an operative drilling position when the apparatus is again started.

Although but one specific embodiment of the invention is herein shown and described, it will be understood that various changes in the size, shape and arrangement of parts may be made without departing from the spirit of the invention.

I claim:

1. In a drill press comprising a fluid pressure system for advancing a drill toward and retracting the same from a piece of work including variable valve mechanism; control apparatus for said valve mechanism including a block movable in unison with said drill and having a series of fixed stops thereon, a bar shiftably mounted on said block having a series of stops movable therewith, a carriage shiftably mounted on said block having a pair of pawls, one engageable with said fixed series of stops and the other engageable with said movable series of stops, resilient means normally holding one of said pawls in engagement with said fixed stops for causing movement of said carriage and block in unison during initial movement of said drill toward a piece of work, means including a member responsive to movement of said carriage and engageable with said latter pawl for disengaging the same from said fixed stops and engaging the other pawl with said movable stops to accommodate resetting movement of said carriage relative to said block during drilling of said work, said member being operatively connected with and adapted to maintain said valve mechanism in a drilling speed setting during said drilling step, and means responsive to drilling movement during the final increment of said drilling step for moving said member out of engagement with said carriage to accommodate re-engagement of one of said pawls with said fixed stops at a new position and for setting said valve mechanism to return said drill and block to their initial positions for performing another similar cycle.

2. In a drill press comprising a fluid pressure system for advancing a drill toward and retracting the same from a piece of work including variable valve mechanism; control apparatus for said valve mechanism including a block movable in unison with said drill and having a series of fixed stops thereon, a bar shiftably mounted on said block having a series of stops movable therewith, means for yieldably opposing movement of said bar in opposite directions, a carriage shiftably mounted on said block having a pair of pawls, one engageable with said fixed series of stops and the other engageable with said movable series of stops, resilient means normally holding one of said pawls in engagement with said fixed stops for causing movement of said carriage and block in unison during initial movement of said drill toward a piece of work, and means including a member responsive to movement of said carriage and engageable with said latter pawl for disengaging the same from said fixed stops and engaging the other pawl with said movable stops to accommodate resetting movement of said carriage relative to said block during drilling of said work.

3. In a drill press comprising a fluid pressure system for advancing a drill toward and retracting the same from a piece of work including variable valve mechanism; control apparatus for said valve mechanism including a block movable in unison with said drill and having a series of fixed stops thereon, a bar shiftably mounted on said block having a series of stops movable therewith, a carriage shiftably mounted on said block having a pair of pawls, one engageable with said fixed series of stops and the other engageable with said movable series of stops, resilient means normally holding one of said pawls in engagement with said fixed stops for causing movement of said carriage and block in unison during initial movement of said drill toward a piece of work, means including a member responsive to movement of said carriage and engageable with said latter pawl for disengaging the same from said fixed stops and engaging the other pawl with said movable stops to accommodate resetting movement of said carriage relative to said block during drilling of said work, said member being operatively connected with and adapted to maintain said valve mechanism in a drilling speed setting during said drilling step, means for limiting movement of said bar relative to said block to predetermine the depth of each drilling step, said member being adapted to move slightly relative to said carriage when said bar is arrested by said limiting means, and means responsive to said latter movement of said member for moving said member out of engagement with said carriage to accommodate re-engagement of one of said pawls with said fixed stops at a new position and for setting said valve mechanism to return said drill and block to their initial positions for performing another similar cycle.

4. In a drill press comprising a fluid pressure system for advancing a drill toward and retracting the same from a piece of work including variable valve mechanism; control apparatus for said valve mechanism including a block movable in unison with said drill and having a series of fixed stops thereon, a bar shiftably mounted on said block having a series of stops movable therewith, a carriage shiftably mounted on said block having a pair of pawls, one engageable with said fixed series of stops and the other engageable with said movable series of stops, resilient means normally holding one of said pawls in engagement with said fixed stops for causing movement of said carriage and block in unison during initial movement of said drill toward a piece of work, means including a member responsive to movement of said carriage and engageable with said latter pawl for disengaging the same from said fixed stops and engaging the other pawl with said movable stops to accommodate resetting movement of said carriage relative to said block during drilling of said work, said member being operatively connected with and adapted to maintain said valve mechanism in a drilling speed setting during said drilling step, means for limiting movement of said bar relative to said block to predetermine the depth of each drilling step, said member being adapted to move slightly relative to said carriage when said bar is arrested by said limiting means, and means responsive to said latter movement of said member for moving said member out of engagement with said carriage to accommodate re-engagement of one of said pawls with said fixed stops at a new position and for setting said valve mechanism to return said drill and block to their initial positions for performing another similar cycle, said limiting means being adjustable and constituting the only essential adjustment required to vary the depth of drilling performed during each cycle of a drilling operation.

5. In valve operating mechanism comprising a valve setting lever; mechanism for actuating said lever comprising a shiftable block having a series of fixed stops thereon, a bar shiftably mounted on said block having a series of stops movable therewith, resilient means for yieldably opposing movement of said bar relative to said block in respectively opposite directions, a carriage shiftably mounted on said block having a cam surface engageable with said lever for actuating the same, pawl mechanism on said carriage engageable by said lever and having projections alternatively engageable with said fixed and movable stops respectively, resilient means normally holding one of said projections in engagement with said fixed stops to cause movement of said carriage and block in unison, said pawl mechanism being movable by engagement thereof with said lever for releasing the latter projection from said fixed stops and engaging the other projection with said movable stops to cause movement of said carriage and bar relative to said block, and means for moving said lever out of engagement with said pawl mechanism to release the latter and reset it at a new position with respect to said series of fixed stops.

6. In valve operating mechanism comprising a valve setting lever; mechanism for actuating said lever comprising a shiftable block having a series of fixed stops thereon, a bar shiftably mounted on said block having a series of stops movable therewith, means for resiliently and yieldably opposing movement of said bar relative to said block in opposite directions in the course of shifting movement of said block, a carriage shiftably mounted on said block having a cam surface engageable with said lever for actuating the same, pawl mechanism on said carriage engageable by said lever and having projections alternatively engageable with said fixed and movable stops respectively, resilient means normally holding one of said projections in engagement with said fixed stops to cause movement of said carriage and block in unison, said pawl mechanism being movable by engagement thereof with said lever for releasing the latter projection from said fixed stops and engaging the other projection with said movable stops to cause movement of said carriage and bar relative to said block, an adjustable limit member for positively arresting movement of said bar relative to said block in one direction, and means operable when movement of said bar is arrested by said limit stop for moving said lever out of engagement with said pawl mechanism to release the latter and reset it at a new position with respect to said series of fixed stops.

7. In valve operating mechanism comprising a valve setting lever; mechanism for actuating said lever comprising a shiftable block having a series of fixed stops thereon, a bar shiftably mounted on said block having a series of stops movable therewith, a carriage shiftably mounted on said block having a cam surface engageable with said lever for actuating the same, pawl mechanism on said carriage engageable by said lever and having projections alternatively engageable with said fixed and movable stops respectively, resilient means normally holding one of said projections in engagement with said fixed stops to cause movement of said carriage and block in unison, said pawl mechanism being movable by engagement thereof with said lever for releasing the latter projection from said fixed stops and engaging the other projection with said movable stops to cause movement of said carriage and bar relative to said block, an adjustable limit member for arresting movement of said bar relative to said block, a resilient member normally urging said bar away from said adjustable limit member, a resilient abutment yieldably opposing said resilient member and adapted to accommodate slight movement of said bar away from said adjustable limit member to facilitate engagement of said movable stops and said pawl mechanism, and means for moving said lever out of engagement with said pawl mechanism to release the latter and reset it at a new position with respect to said series of fixed stops.

EDGAR FOSHIE.